(12) United States Patent
Joki et al.

(10) Patent No.: US 10,753,402 B2
(45) Date of Patent: Aug. 25, 2020

(54) BEARING ASSEMBLY AND BEARING CAGE

(71) Applicant: The Timken Company, North Canton, OH (US)

(72) Inventors: Mark A. Joki, Dover, OH (US); John H. Rhodes, North Canton, OH (US)

(73) Assignee: The Timken Company, North Canton, OH (US)

(*) Notice: Subject to any disclaimer, the term of this patent is extended or adjusted under 35 U.S.C. 154(b) by 0 days.

(21) Appl. No.: 16/326,745

(22) PCT Filed: Sep. 15, 2017

(86) PCT No.: PCT/US2017/051696
§ 371 (c)(1),
(2) Date: Feb. 20, 2019

(87) PCT Pub. No.: WO2018/102003
PCT Pub. Date: Jun. 7, 2018

(65) Prior Publication Data
US 2019/0226527 A1 Jul. 25, 2019

Related U.S. Application Data

(60) Provisional application No. 62/428,591, filed on Dec. 1, 2016.

(51) Int. Cl.
*F16C 43/04* (2006.01)
*F16C 33/46* (2006.01)

(52) U.S. Cl.
CPC .......... *F16C 43/04* (2013.01); *F16C 33/4605* (2013.01); *F16C 33/4676* (2013.01)

(58) Field of Classification Search
CPC .............. F16C 33/4605; F16C 33/4623; F16C 33/4629; F16C 33/4635; F16C 33/4676;
(Continued)

(56) References Cited

U.S. PATENT DOCUMENTS 2,977,164 A 3/1961 Witte
3,482,891 A 12/1969 Evangelista et al.
(Continued)

FOREIGN PATENT DOCUMENTS

CN 101813133 A 8/2010
DE 2922361 A1 12/1980
(Continued)

OTHER PUBLICATIONS

Office Action issued by the China National Intellectual Property Administration for Application No. 2011780060910.0, dated Dec. 19, 2019 (14 pages including English translation).
(Continued)

*Primary Examiner* — James Pilkington
(74) *Attorney, Agent, or Firm* — Michael Best & Friedrich LLP

(57) ABSTRACT

A bearing assembly includes an outer ring having an outer raceway and an inner ring having an inner raceway and a flange defining an outer diameter of the inner ring. A plurality of rolling elements is retained between the outer and inner rings on the outer and inner raceways. A cage has first and second side rings interconnected by a plurality of bridges to form a plurality of windows, each window receiving a respective rolling element to maintain relative spacing between adjacent rolling elements. At least some of the bridges include a projection on a radially inner side such that the plurality of projections together define an inner diameter of the cage, the inner diameter of the cage being smaller than the outer diameter of the inner ring to create interference and deformation of the cage as the cage is installed over the flange of the inner ring.

20 Claims, 3 Drawing Sheets

(58) Field of Classification Search
CPC ...... F16C 33/54; F16C 33/542; F16C 33/543; F16C 43/04; F16C 43/065; F16C 43/083
See application file for complete search history.

(56) References Cited

U.S. PATENT DOCUMENTS

| | | | |
|---|---|---|---|
| 4,019,791 A * | 4/1977 | Loberg | F16C 33/385 |
| | | | 384/526 |
| 4,557,614 A * | 12/1985 | Knappe | F16C 19/26 |
| | | | 384/573 |
| 5,352,047 A | 10/1994 | Ingall et al. | |
| 5,882,125 A * | 3/1999 | Wahler | F16C 19/26 |
| | | | 384/572 |
| 5,964,536 A | 10/1999 | Kinoshita | |
| 6,666,585 B1 | 12/2003 | Kotzalas et al. | |
| 7,670,058 B2 | 3/2010 | Schorr et al. | |
| 7,789,570 B2 | 9/2010 | Tsujimoto | |
| 8,568,038 B2 | 10/2013 | Lemaitre et al. | |
| 8,783,966 B2 | 7/2014 | Schlegel et al. | |
| 8,888,373 B2 | 11/2014 | Mangold et al. | |
| 8,985,860 B2 | 5/2015 | Honjo | |
| 9,316,255 B2 | 4/2016 | Yasuda | |
| 2007/0248297 A1 | 10/2007 | Shorr et al. | |
| 2010/0129022 A1 | 5/2010 | Beyfuss et al. | |
| 2015/0323008 A1 | 11/2015 | Koganei et al. | |
| 2016/0273580 A1 * | 9/2016 | Kajikawa | F16C 33/48 |
| 2016/0319868 A1 | 11/2016 | Kirchhoff et al. | |
| 2017/0102032 A1 | 4/2017 | Heaton | |
| 2017/0227084 A1 | 8/2017 | Ditzel et al. | |

FOREIGN PATENT DOCUMENTS

| | | |
|---|---|---|
| DE | 9003461 U1 | 5/1990 |
| EP | 1698789 B1 | 9/2006 |
| EP | 3104030 A1 | 12/2016 |
| JP | 54140047 A | 10/1979 |
| JP | 2012132508 A | 7/2012 |
| JP | 2014119059 A | 6/2014 |
| RU | 2473826 C2 | 1/2013 |
| SU | 539175 A1 | 1/1977 |
| WO | 2017/059850 A1 | 4/2017 |

OTHER PUBLICATIONS

International Search Report and Written Opinion for Application No. PCT/US2017/051696 dated Nov. 13, 2017 (14 pages).

* cited by examiner

BEARING ASSEMBLY AND BEARING CAGE

RELATED APPLICATIONS

This application claims the benefit of U.S. Provisional Patent Application No. 62/428,591 filed on Dec. 1, 2016, the entire content of which is hereby incorporated by reference herein.

BACKGROUND

The present invention relates to rolling element bearings, and more particularly to cages for rolling element bearings.

SUMMARY

A cage maintains the relative spacing of rolling elements between an inner ring and an outer ring of a bearing assembly. The present invention provides a new cage for rolling element bearings. The cage includes first and second side rings interconnected by a plurality of bridges. Some or all of the bridges include a projection formed along the axial length and on the radial inner side or on the radial outer side depending on the bearing. The projections can assist with retention during assembly, handling during installation, and piloting of the cage. The projections cause deformation of the cage as the cage is installed over the inner ring or into the outer ring during assembly.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
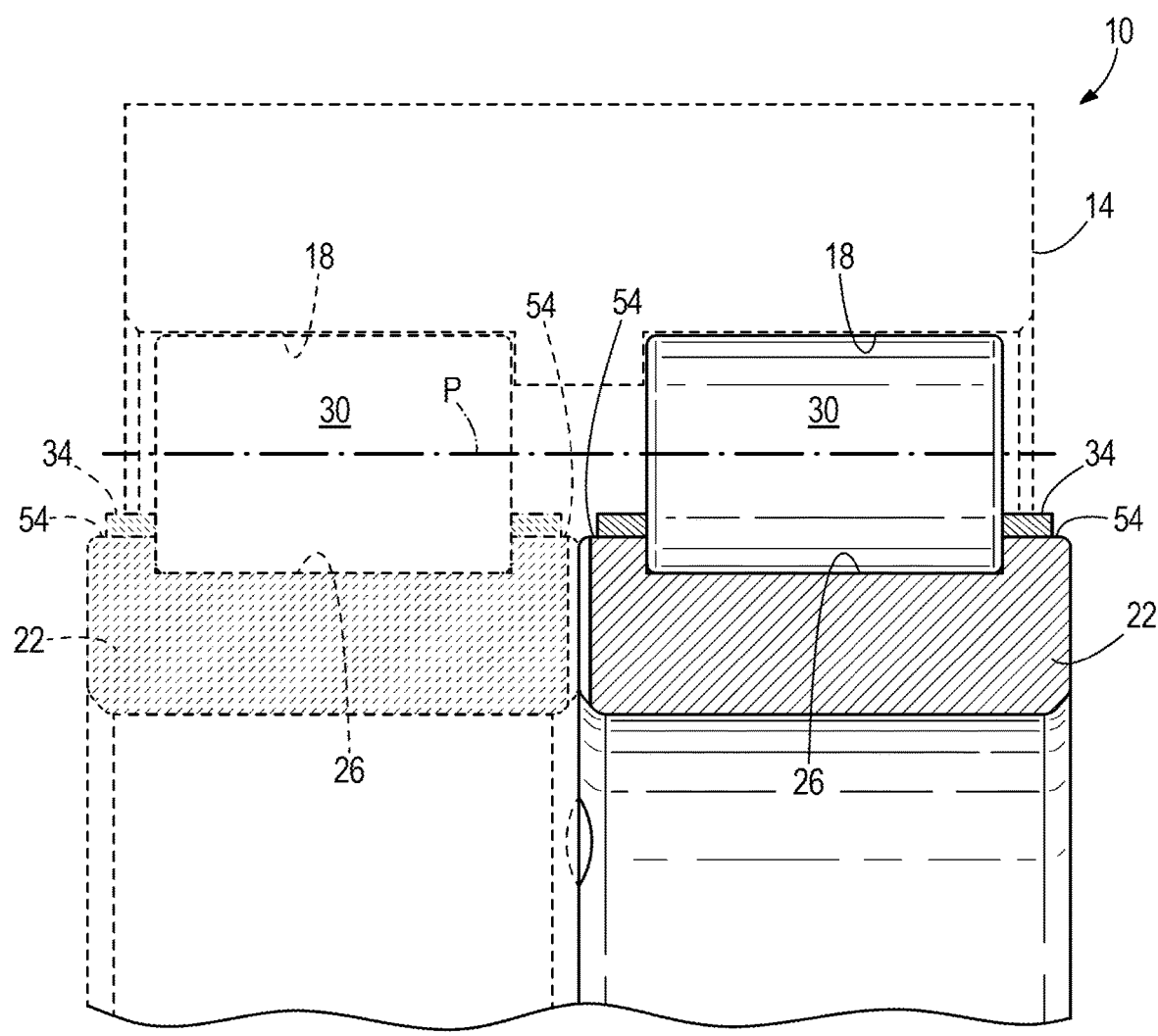
FIG. 1 is a partial section view of a double-row cylindrical roller bearing embodying the invention.
Figure 2:
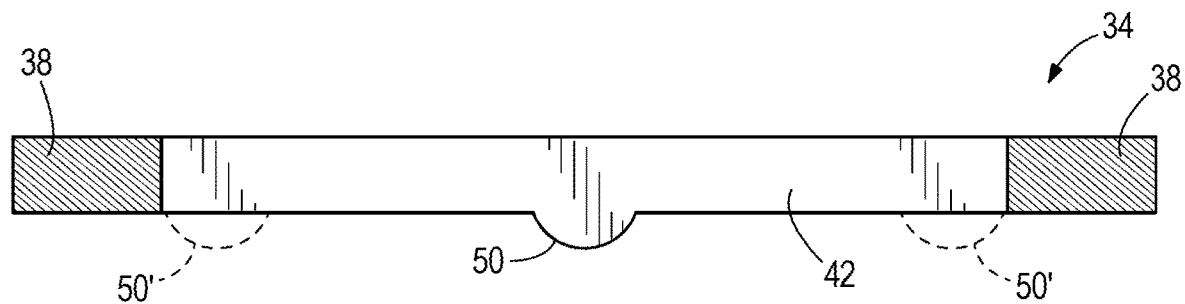
FIG. 2 is a partial section view of the cage of the bearing shown in FIG. 1.
Figure 3:
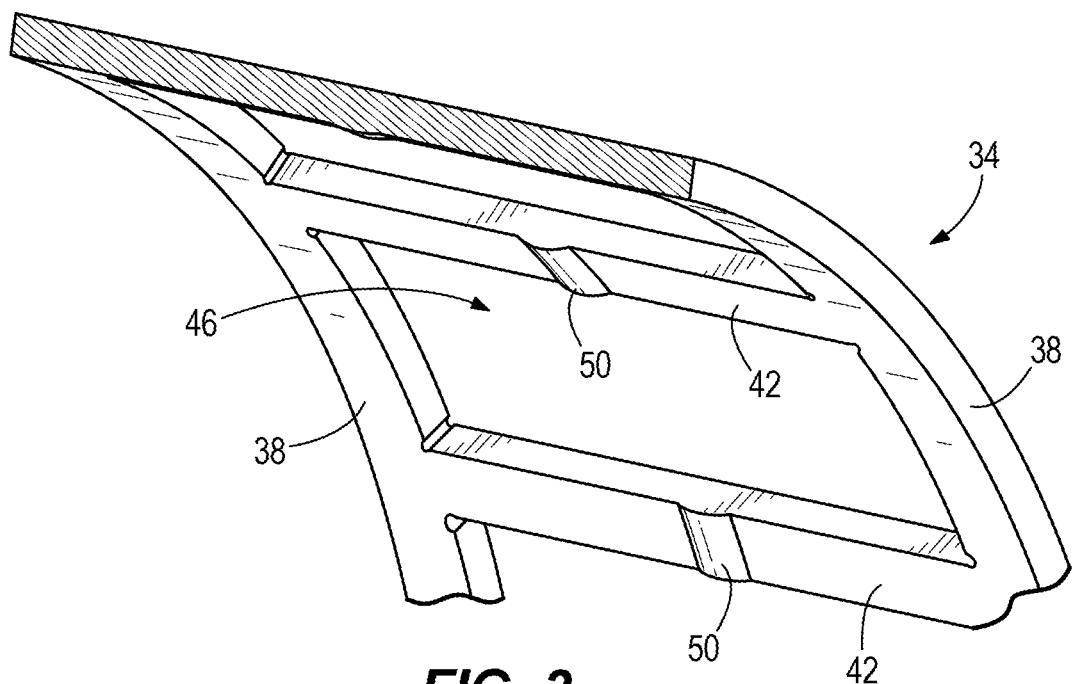
FIG. 3 is a partial perspective view of a portion of the cage of FIG. 1.
Figure 4:
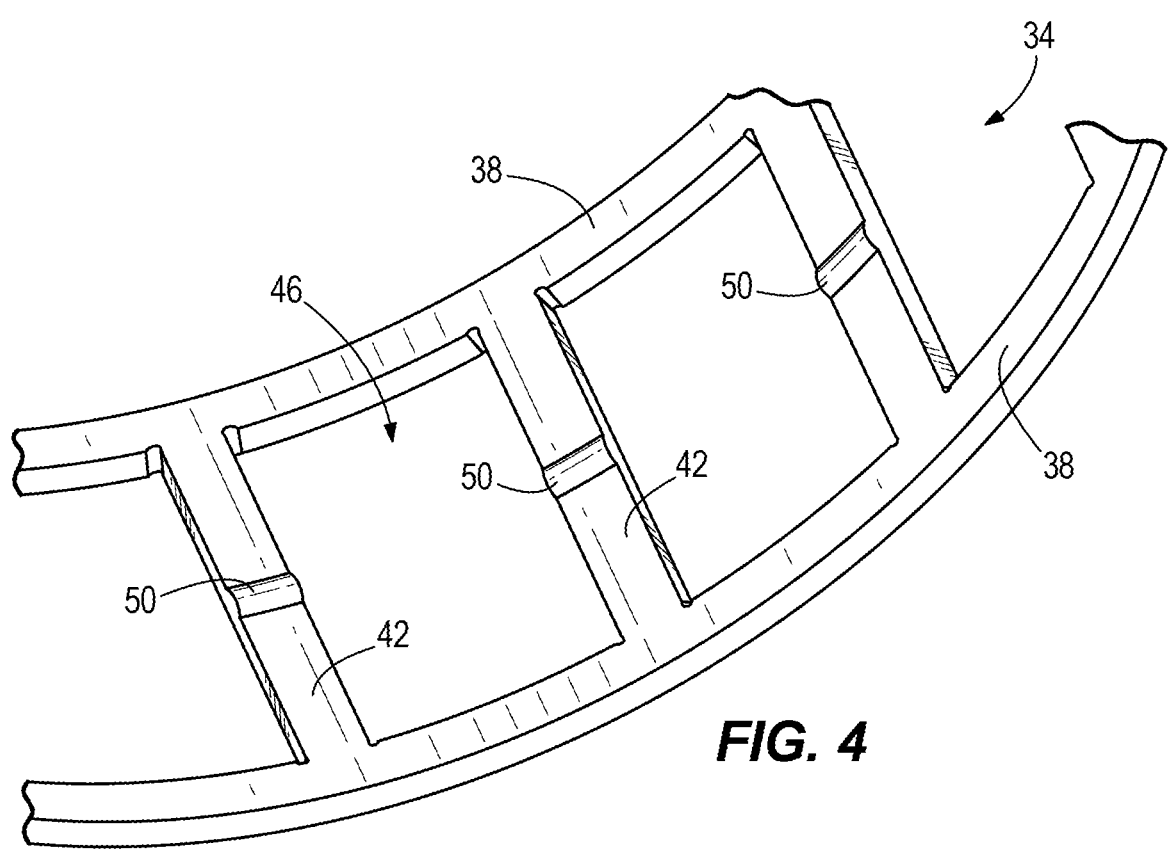
FIG. 4 is another partial perspective view of a portion of the cage of FIG. 1.
Figure 5:
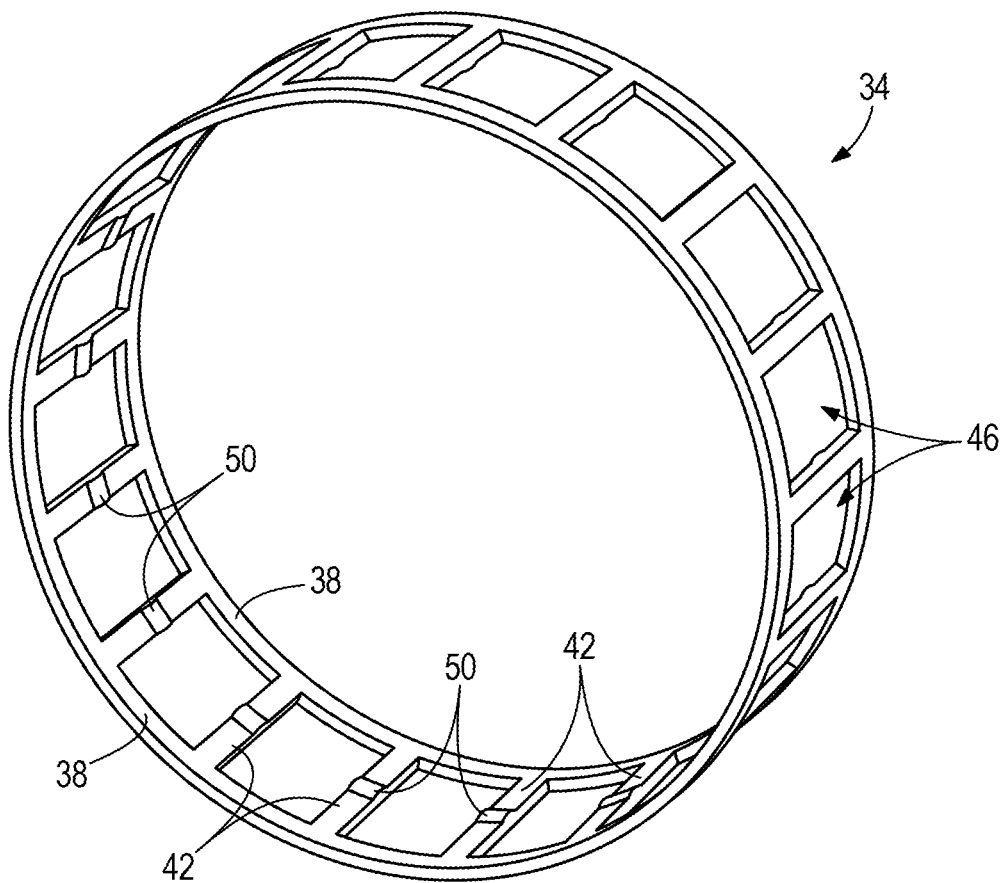
FIG. 5 is a perspective view of the entire cage of FIG. 1.

FIG. 1 illustrates a double-row cylindrical roller bearing 10 according to the present invention. As shown in FIG. 1, the second row is shown in phantom to indicate that it may or may not be present, in which case the invention can also apply to single-row cylindrical roller bearings. Additionally, more than two rows could also be present. The bearing 10 includes an outer ring 14, which defines thereon one or more outer raceways 18. The bearing 10 further includes one or more inner rings 22, each of which defines thereon an inner raceway 26. A plurality of rolling elements 30 (e.g., cylindrical rollers) are positioned between the inner and outer rings 14, 22 on the raceways 18, 26. It is to be understood that the outer ring, 14, the inner ring 22, or both could be integrated with other components being supported by the bearing 10, such as a shaft, a housing, a gear, etc.

The rolling elements 30 in each row are retained in relative position to one another by a cage 34. The illustrated cage 34 has a diameter that is smaller than a diameter defined by the pitch circle P of the rolling elements 30 in order to retain the rollers 30 well below their pitch circle P. In this manner, the number of rolling elements 30 in each row can be increased relative to a similar bearing in which the cage diameter matches or substantially matches the pitch circle diameter. In this regard, the bearing 10 can be considered to be a high-capacity bearing based on an increased number of rolling elements 30.

FIGS. 2-5 illustrate the cage 34 in greater detail. The cage 34 includes first and second side rings 38, which are circular in shape. A plurality of bridges 42 interconnect the side rings 38, and together with the side rings 38, define windows 46 that receive a respective rolling element 30 to maintain the relative spacing between adjacent rolling elements 30. As illustrated, the thickness of the side rings 38 and bridges 42 can be substantially uniform over a majority of the cage 34, except for the presence of a plurality of projections 50. In the illustrated embodiment, each bridge 42 includes one projection 50 situated approximately mid-way along the axial length and on the radial inner side of the bridge 42. In other embodiments, the projection 50 could be closer to one side ring 38 than the other side ring 38. For example, the projection could be positioned closely adjacent to one of the side rings 38 (e.g., one to ten millimeters from an edge of the side ring 38—see for example one of the projections 50' shown in FIG. 2). In yet other embodiments, more than one (e.g., two) projections 50 could be provided in spaced-apart relation on each bridge 42. For example, two projections 50' (shown in phantom in FIG. 2) on a single bridge 42 could be spaced apart such that a distance between the axial outermost edges of the two projections is smaller than a distance between the axial innermost edges of the flanges 54 of the inner ring 22 (see FIG. 1) to accurately locate and position the cage 34 in place relative to the inner raceway 26. In yet other embodiments, the projections 50 may be present on fewer than all of the bridges 42. For example, projections 50 may be provided on every other bridge 42, or perhaps on as few as only one, two, three, or four of the bridges 42. Two projections 50 spaced apart at about 180°, three projections 50 spaced apart at about 120°, or four projections 50 spaced apart at about 90° could be used. The illustrated projections 50 define a location of increased thickness of the bridge 42 compared to the remainder of the bridge's otherwise substantially constant thickness. In other embodiments, the projection 50 could be formed from a radially inwardly-directed deviation of the bridge 42, such that the thickness of the bridge 42 could remain constant, even at the projection 50. The cage 34 forms a closed circle, and in some embodiments, includes a weld line (not shown) where the two ends of the cage 34 are joined together in the circular form. In other embodiments, the cage 34 is machined or otherwise formed to its circular form so no welding is required.

The projections 50, 50' project radially inwardly and are sized and configured to create interference between the inner diameter of the cage 34 (as defined by the plurality of projections 50, 50') and the outer diameter of one of the flanges 54 (see FIG. 1) of the inner ring 22. To install the cage 34 onto the inner ring 22, the installer exerts sufficient axial force on the cage 34 so that the cage 34 will deform radially outwardly in an elastic manner so that the projections 50, 50' can slide over the flange 54. In an alternative installation technique especially applicable with the projections 50', the un-deformed cage 34 is placed against the inner ring 22 with its cage axis tilted relative to the bearing or inner ring axis. A concentrated radially-outward force is applied to the inner diameter surface of the cage 34 to deflect the cage 34, and some of the projections 50' in the vicinity of the applied force, over the flange 54 in that vicinity. This localized and concentrated deflecting of the cage 34 is repeated at various positions about the cage 34 until all of the projections 50' have passed over the flange 54. In yet another alternative technique, concentrated radially-inward forces can be applied to opposite sides of the outer diameter surface of the cage 34 to cause the cage 34 to deform (e.g., into an oval or elliptical shape) such that projections 50, 50' along the major axis, which is created by the inwardly-directed forces, can pass over the flange 54. The inwardly-directed forces can then be removed and re-applied around the circumference of the cage 34 as needed to move all of the projections 50, 50' past the flange 54.

This interference prevents the installer from simply dropping the cage 34 onto the inner ring 22 in a manner that might potentially damage the cage 34 or the inner ring 22. By having all, most, or some of the bridges 42 include a projection 50, 50', the bridges 42 will all be spaced slightly from the outer diameter of the flange 54, thereby providing for piloted installation of the cage 34 over the flange 54. Once the projections 50, 50' clear the flange 54 and are positioned axially over the inner raceway 26, the cage 34 will elastically return to its original, un-deformed state. With the projections 50, 50' positioned over the inner raceway 26 and axially between the two flanges 54, the cage 34 is retained on the inner ring 22 such that it cannot fall off of the inner ring 22. When handling the assembled inner ring 22 and cage 34, a user need not be concerned with the cage 34 falling off the inner ring 22 onto the floor or work surface. The interference between the projections 50, 50' and the flanges 54 will retain the cage 34 in both axial directions to prevent unwanted or accidental separation.

The size and shape of the projections 50, 50' can be varied, depending on the dimensions of the inner ring 22 and the cage 34, to provide the desired interference. In the illustrated embodiment, a maximum interference of 1 mm on diameter is observed. A finite element analysis was performed to confirm that the deformation in the cage 34 caused by the interference between the projections 50, 50' and the flange 54 would only cause elastic deformation of the cage 34, and that any weld line of the cage 34 would not be compromised. While the illustrated projections 50, 50' are shown as having a rounded surface or a curvature or a radius in the axial direction, other embodiments may take other forms (e.g., a truncated cone, a truncated pyramid, etc.). In some embodiments, the projections 50, 50' are designed without any sharp corners or edges to minimize surface damage to the flange 54. Additionally, the projections 50, 50' are shown as extending across the entire circumferential width of each bridge 42, however other embodiments might have projections that extend less than the entire circumferential width of the bridges 42.

The projections 50, 50' can be formed by a variety of methods. For example, the cage 34 can be machined from tubular or bar stock, with the projections 50, 50' formed via material removal around the projections 50, 50'. Alternatively, the cage 34 can be formed by stamping or forging, with the projections 50, 50' being integrally formed by the stamping or forging die. Alternatively, the projections 50, 50' could be formed in a secondary step by coining the previously stamped/forged form. In yet another alternative, the cage 34 can be formed using an additive manufacturing process. One option for manufacturing the cage 34 includes drawing a circular cup from flat stock, machining (e.g., by turning) the projections 50, 50' and optionally some of the cylindrical and/or face surfaces, forming the windows 46 (e.g., by pressing/stamping), and forming the shape of the bridges 42 (e.g., by pressing/stamping). Other known methods can be also used for forming the cage 34 and the projections 50, 50'.

Figure 6:
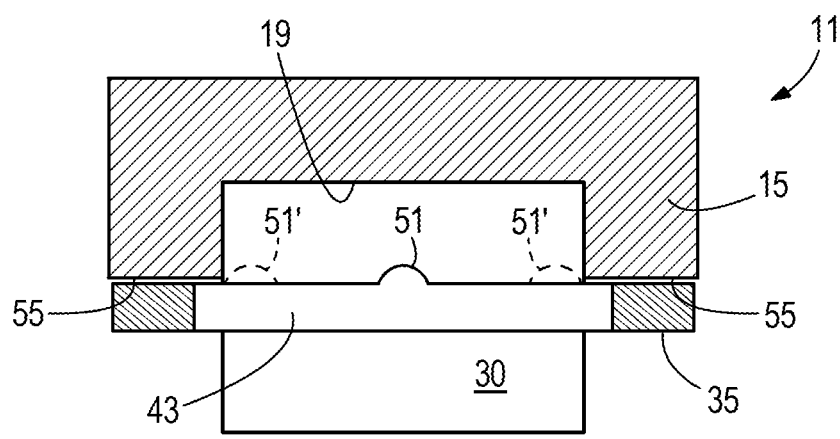
FIG. 6 is a partial section view of an alternative embodiment of a cylindrical roller bearing embodying the invention, shown with the inner ring removed for clarity.

While the invention is shown and described in FIGS. 1-5 with the cage 34, and more specifically the projections 50, 50', interacting/interfering with the inner ring 22 of the bearing 10, the inventive concept can likewise be applied to cylindrical roller bearings 11 that have flanges 55 on the outer ring 15 and in which the cage 35 interacts with the outer ring 15 instead of the inner ring to be above the pitch circle of the rolling elements 30 (see FIG. 6). As shown in FIG. 6, the projections 51 can be positioned on the radial outer side of the bridge 43 to define a cage outer diameter that is larger than an inner diameter of the outer ring 15 at the flange 55. The projections 51 project radially outwardly and are sized and configured to create interference between the outer diameter of the cage 35 (as defined by the plurality of projections 51) and the inner diameter of one of the flanges 55 of the outer ring 15. To install the cage 35 into the outer ring 15, the installer exerts sufficient axial force on the cage 35 so that the cage 35 will deform radially inwardly in an elastic manner so that the projections 51 can slide over the flange 55. Once the projections 51 clear the flange 55 and are positioned axially over the outer raceway 19, the cage 35 will elastically return to its original, un-deformed state.

With this alternative embodiment, the same benefits described above are obtained, and the same considerations and alternatives regarding the geometry, number, and location of the projections apply equally. For example, the projection or projections 51 could be positioned closely adjacent to one or both of the side rings along the bridge 43 in the manner described above with respect to the projections 50' (see projections 51' in FIG. 6).

Various features and advantages of the invention are set forth in the following claims.

What is claimed is:

1. A bearing assembly comprising:
  an outer ring having an outer raceway;
  an inner ring having an inner raceway;
  a plurality of rolling elements retained between the outer and inner rings on the outer and inner raceways; and
  a cage having a first side ring and a second side ring interconnected by a plurality of bridges to form a plurality of windows, each window receiving a respective rolling element to maintain relative spacing between adjacent rolling elements;
  wherein at least some of the bridges include either
  (a) a projection on a radially inner side such that the plurality of projections together define an inner diameter of the cage, the inner diameter of the cage being smaller than an outer diameter of the inner ring as defined by a flange of the inner ring to create interference and deformation of at least the first side ring of the cage as the cage is installed over the flange of the inner ring, or
  (b) a projection on a radially outer side such that the plurality of projections together define an outer diameter of the cage, the outer diameter of the cage being larger than an inner diameter of the outer ring as defined by a flange of the outer ring to create interference and deformation of at least the first side ring of the cage as the cage is installed inside the flange of the outer ring.

2. The bearing assembly of claim 1, wherein every bridge includes a projection.

3. The bearing assembly of claim 1, wherein fewer than all of the bridges include a projection.

4. The bearing assembly of claim 1, wherein the projection is located substantially midway along an axial length of the bridge.

5. The bearing assembly of claim 1, wherein the projection is closer to the first side ring than the second side ring.

6. The bearing assembly of claim 1, wherein at least some of the bridges include two projections.

7. The bearing assembly of claim 1, wherein the projections are formed of metal without any corners along an axial direction of the cage.

8. The bearing assembly of claim 1, wherein the projections are on a radially inner side of the bridges such that the plurality of projections together define an inner diameter of the cage, and wherein a maximum interference between the inner diameter of the cage and the outer diameter of the inner ring is 1 mm.

9. The bearing assembly of claim 1, wherein the projections are curved in an axial direction of the bearing cage.

10. The bearing assembly of claim 1, wherein the projections extend across an entire circumferential width of the bridges.

11. The bearing assembly of claim 1, wherein the projections are configured such that engagement with the respective flange of the inner ring or the outer ring causes the cage to elastically deform from a circular shape to a non-circular shape.

12. A bearing cage comprising:
    a first side ring and a second side ring; and
    a plurality of bridges interconnecting the first and second side rings to form a plurality of windows, at least one of the bridges including a radially inwardly extending projection on a radially inner side of the bridge, or a radially outwardly extending projection on a radially outer side of the bridge, the projection being formed of metal without any corners along an axial direction of the bearing cage.

13. The bearing cage of claim 12, wherein the projection defines a location of increased thickness of the bridge.

14. The bearing cage of claim 12, wherein every bridge includes a projection.

15. The bearing cage of claim 12, wherein fewer than all of the bridges include a projection.

16. The bearing cage of claim 12, wherein the projection is located substantially midway along an axial length of the bridge.

17. The bearing cage of claim 12, wherein the projection is closer to the first side ring than the second side ring.

18. The bearing cage of claim 12, wherein at least some of the bridges include two projections.

19. The bearing cage of claim 12, wherein the projection is curved in the axial direction of the bearing cage.

20. The bearing cage of claim 12, wherein the projection extends across an entire circumferential width of the bridge.

* * * * *